United States Patent [19]
Wright

[11] Patent Number: 5,340,081
[45] Date of Patent: Aug. 23, 1994

[54] MEANS FOR POSITIVELY SEATING A PIEZOCERAMIC ELEMENT IN A PIEZOELECTRIC VALVE DURING INLET GAS INJECTION

[75] Inventor: Kenneth E. Wright, Yardley, Pa.

[73] Assignee: The United States of America as represented by the United States Department of Energy, Washington, D.C.

[21] Appl. No.: 72,371

[22] Filed: Jun. 7, 1993

[51] Int. Cl.⁵ ............................................. F16K 31/04
[52] U.S. Cl. .................................. 251/129.06; 251/368
[58] Field of Search ............................ 251/129.06, 368

[56] References Cited

U.S. PATENT DOCUMENTS

| | | |
|---|---|---|
| 4,492,360 | 1/1985 | Lee, II et al. . |
| 4,756,508 | 7/1988 | Giachino et al. ............ 251/129.06 X |
| 4,903,732 | 2/1990 | Allen . |
| 5,029,610 | 6/1991 | Hiratsuka et al. . |

FOREIGN PATENT DOCUMENTS

| | | | |
|---|---|---|---|
| 2642812 | 8/1990 | France | .......................... 251/129.06 |
| 0141381 | 6/1987 | Japan | .......................... 251/129.06 |

OTHER PUBLICATIONS

"Pre-Operational Test Results of the TFTR Neutral Beam D-T Gas Delivery System" by Wright et al., 10th Topical Meeting on the Technology of Fusion Energy, Boston, Mass. Princeton University Report J-384, Jun. 7-12, 1992.

*Primary Examiner*—Arnold Rosenthal
*Attorney, Agent, or Firm*—Mark P. Dvorscak; Robert J. Fisher; William R. Moser

[57] ABSTRACT

A piezoelectric valve in a gas delivery system includes a piezoceramic element bonded to a valve seal and disposed over a valve seat, and retained in position by an O-ring and a retainer; an insulating ball normally biased by a preload spring against the piezoceramic element; an inlet gas port positioned such that upon admission of inlet gas into the valve, the piezoceramic element is positively seated. The inlet gas port is located only on the side of the piezoceramic element opposite the seal.

2 Claims, 3 Drawing Sheets

PIEZOELECTRIC VALVE CHARACTERIZATION CURVES

MEANS FOR POSITIVELY SEATING A PIEZOCERAMIC ELEMENT IN A PIEZOELECTRIC VALVE DURING INLET GAS INJECTION

CONTRACTUAL ORIGIN OF THE INVENTION

The United States Government has rights in this invention pursuant to Contract No. DE-AC02-76CH03073 between the U.S. Department of Energy and Princeton University.

BACKGROUND OF THE INVENTION

This invention has utilization in all applications with piezoelectric valves utilizing piezoceramic elements or diaphragms.

A new gas delivery system is being designed to inject either tritium, hydrogen, or deuterium gas with uniform throughput for up to 6 seconds into the Tokamak Fusion Test Reactor (TFTR) Neutral Beam Long Pulse Ion Sources, at Princeton University.

Several experiments have been conducted to verify design concepts and qualify components. Piezoelectric valves were characterized for hydrogen and deuterium gas and the data used to predict operation with tritium. The uniformity of the gas throughput was studied as a function of test fluid, flow rate and initial supply pressure. The uniformity of the throughput with an active pressure feedback controller was tested under various operational scenarios. The functionality of a prototypical NB D-T Gas Delivery System has been tested and the results analyzed.

FIG. 2 illustrates, a typical, or prior-art, piezoelectric valve 20 that can be used for delivering tritium or deuterium gas in the Tokamak Fusion Test Reactor at Princeton University. The valve 20 is a commercially available piezoelectric valve manufactured by Maxtek Inc., which has been modified to handle hazardous and radioactive gases. The valve 20 includes a piezoceramic element 22 that is bonded to a seal 24 that together are disposed over an adjustable seat 26. The valve also includes a sapphire insulating ball 28 held in place by a preload spring 29. Gas flows into the valve 20 through gas inlet port 30. As can be seen the inlet port 30 flows into a volume bounded by the underside 32 of piezoceramic element 22, i.e. on the same side with the seal 24. Additional by-pass port 34, for gas flow around the piezoceramic element 22, was expected to help equalize pressure on the piezoceramic element.

It is a purpose of the present invention to provide a piezoelectric valve suitable for use in a neutral beam deuterium-tritium gas delivery system.

Another purpose of the present invention is to provide a piezoelectric valve that helps to equalize pressure on the piezoceramic element such that it positively seats.

SUMMARY OF THE INVENTION

A piezoelectric valve in a gas delivery system may include a piezoceramic element with a valve seal bonded to it, and that together are disposed over a valve seat, and retained in position by an O-ring and a retainer; an insulating ball normally biased by a preload spring against the piezoceramic element; an inlet gas port positioned such that upon admission of inlet gas into the valve, the valve is positively seated. The inlet gas port is located only on the side of the piezoceramic element opposite the seal.

Another piezoelectric valve in a gas delivery system may include a piezoceramic element disposed over a valve seal and a valve seat, and retained in position by an O-ring and a retainer; an insulating ball normally biased by a preload spring against the piezoceramic element; and, an inlet gas port positioned such that a pressure surge that occurs from the admission of inlet gas into the valve causes the valve to positively seat. The inlet gas port is located only on the side of the piezoceramic element opposite the seal.

BRIEF DESCRIPTION OF THE DRAWINGS

The above-mentioned and other features of the invention will become more apparent and be best understood, together with the description, by reference to the accompanying drawings, in which.

DESCRIPTION OF THE PREFERRED EMBODIMENTS

Figure 1:
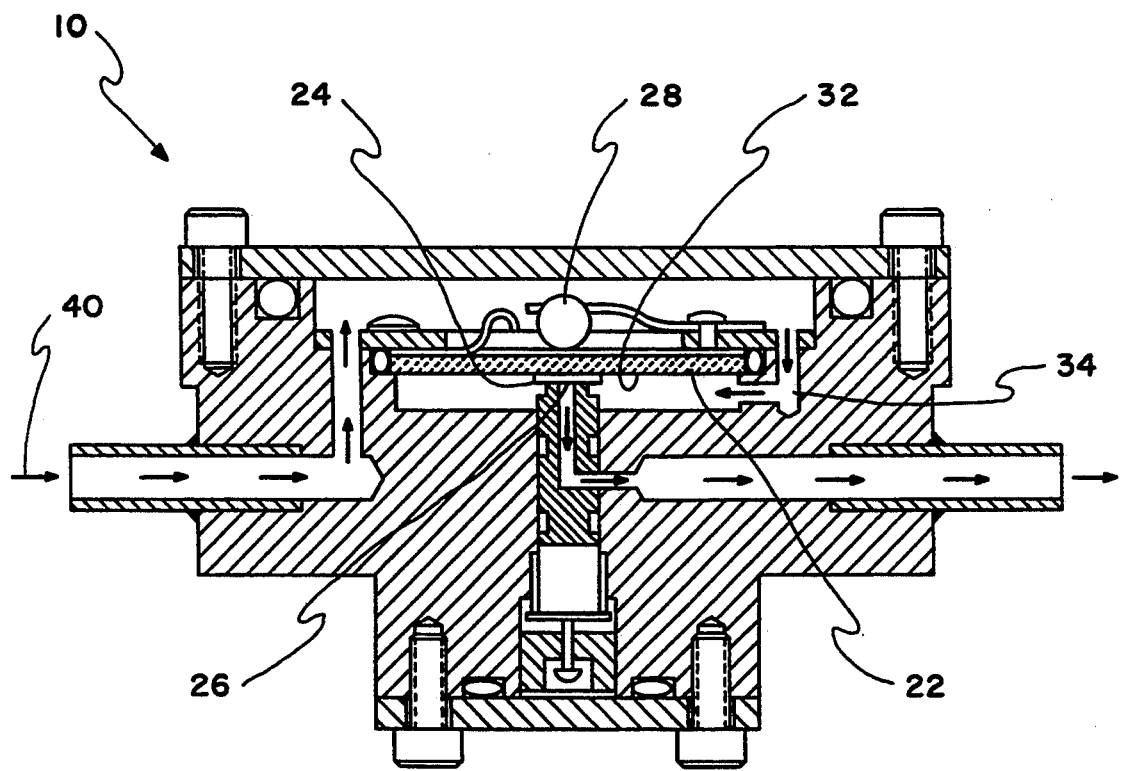
FIG. 1 illustrates a preferred embodiment of a piezoelectric valve in accordance with the present invention.
Figure 2:
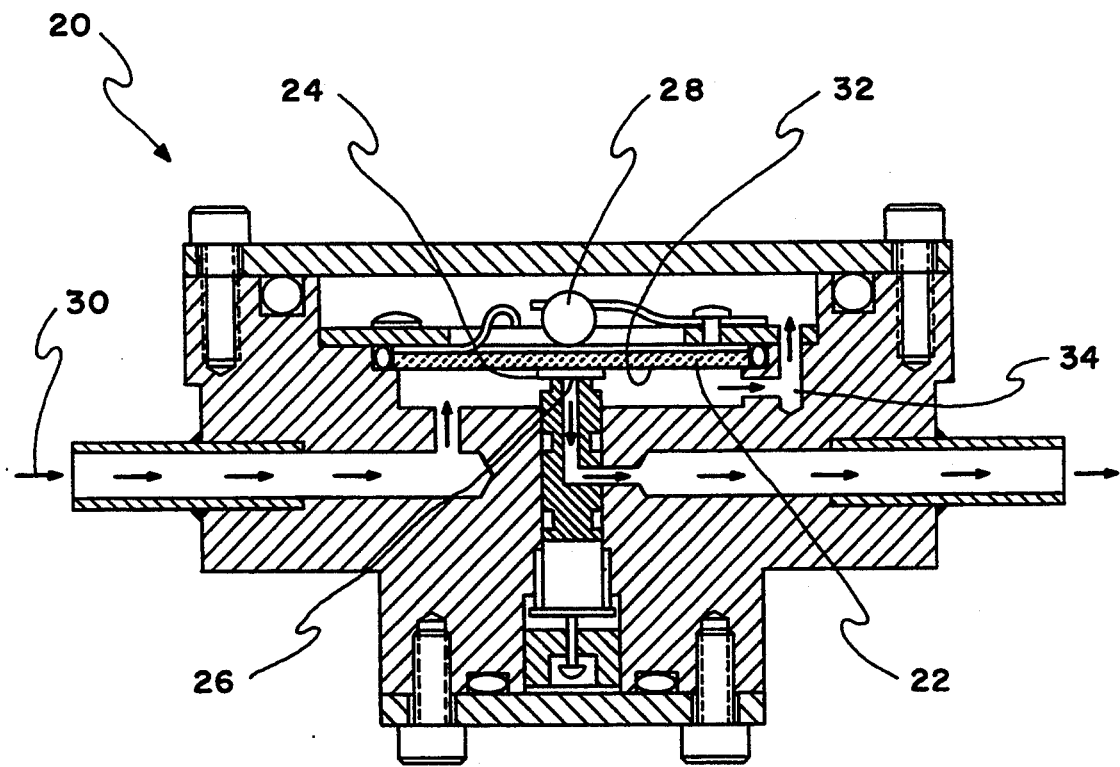
FIG. 2 illustrates a prior an type piezoelectric valve.

Referring now to FIG. 1, a preferred embodiment of a piezoelectric valve 10 in accordance with the present invention is shown. This valve includes the same elements as included in the valve of FIG. 2, and the same element numbers for like parts (piezoceramic element 22, seal 24, seat 26, sapphire insulating ball 28, pre-load spring 29, and underside 32 of piezoceramic element) are used. However, in FIG. 1, the gas inlet port 40 is located such that inlet gas is admitted only onto the side of the piezoceramic element, opposite the seal 24. This new position for the gas inlet port causes the seal bonded to the piezoceramic element to positively seat.

Figure 3:
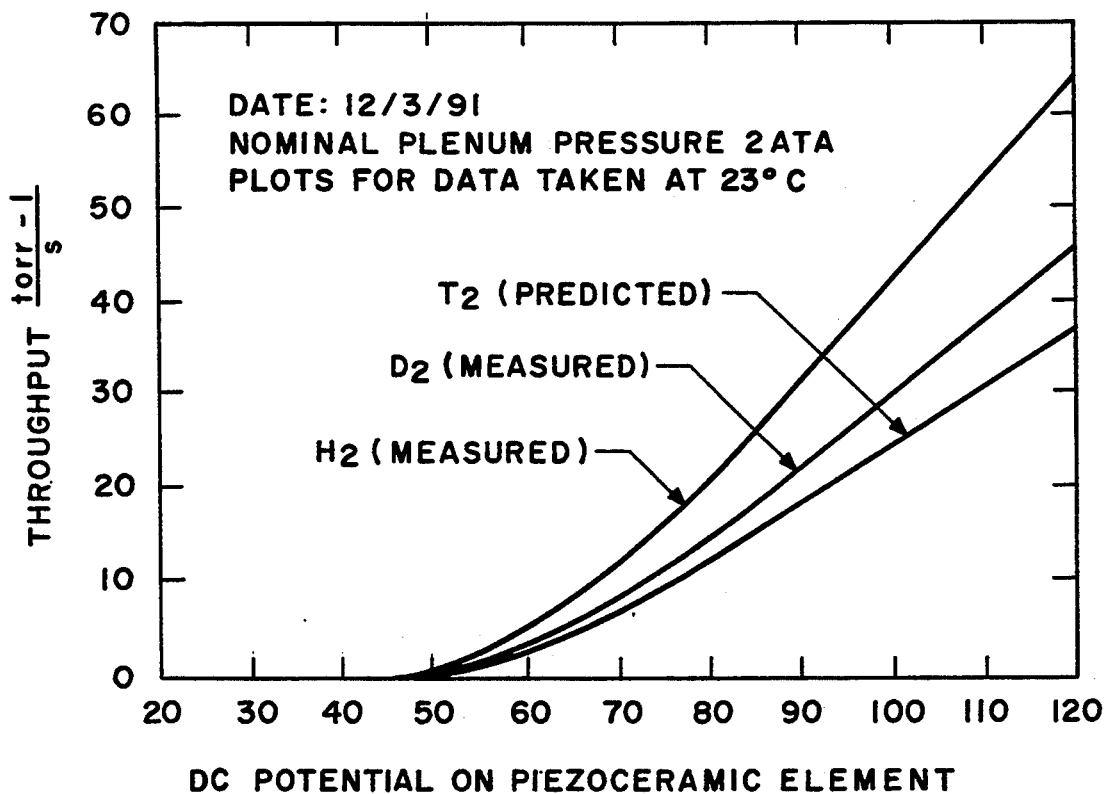
FIG. 3 shows typical piezoelectric valve characterization curves for hydrogen and deuterium (measured), and tritium (predicted).

The performance of the piezoelectric valve was established from individual test points obtained by pulsing the valve at different voltages for half second pulses. Typical piezoelectric valve characterization curves for hydrogen and deuterium are shown in FIG. 3. For the diatomic gasses, elementary considerations predict that a valve having sonic flow at its seat will have a gas throughput which is inversely proportional to the square root of the molecular weight of the gas flowing. For example, at 120 volt DC, the throughput rates of deuterium (46 torr-l/s) and that of hydrogen (65 torr-l/s) relate as:

$$65/46 \approx 1.4 \approx (M_{Deuterium}/M_{Hydrogen})^{\frac{1}{2}} \approx (4/2)^{\frac{1}{2}} \approx 1.414$$

This relationship was used to predict the performance of the valve with tritium (see FIG. 3).

To minimize exposure of elastomeric seals and the piezoceramic element to tritium, the piezoelectric valve is isolated from the storage plenum by a metal sealed pneumatic valve. Tests revealed that opening this pneumatic valve after the plenum was pressurized introduced a pressure surge which exerted sufficient force on the piezoceramic element to alter its calibration and sealing capability. Adding additional by-pass ports around the piezoceramic element to help equalize pressure on the piezoceramic element and another inlet gas port did not satisfactorily correct these problems. Relocating the inlet port to admit inlet gas only onto the side of the piezoceramic element opposite the seal caused the valve to positively seat and eliminated these problems. The changes to the inlet flow passages as described above have eliminated unacceptable characteristics in the piezoelectric valve, i.e. changes in calibration and leakage through the valve following a pressure surge at the inlet port to the valve.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described to best explain the principles of the invention and its practical application and thereby enable others skilled in the art to best explain the principles of the invention and its practical application and thereby enable others skilled in the art to best utilize the invention in various embodiments and with various modifications as are suited to the particular use contemplated. It is intended that the scope of the invention be defined by the claims appended hereto.

The embodiments of the invention in which an exclusive property of privilege is claimed are defined as follows:

1. A piezoelectric valve in a gas delivery system comprising:
   a piezoceramic element bonded to a valve seal and disposed over a valve seat, and retained in position by an O-ring and a retainer;
   an insulating ball normally biased by a preload spring against the piezoceramic element;
   an inlet gas port located only on the side of the piezoceramic element opposite the seal such that upon admission of inlet gas into the valve, the piezoceramic element and seal is positively seated.

2. A piezoelectric valve in a gas delivery system comprising:
   a piezoceramic element bonded to a valve seal and disposed over a valve seat, and retained in position by an O-ring and a retainer;
   an insulating ball normally biased by a preload spring against the piezoceramic element; and,
   an inlet gas port located only on the side of the piezoceramic element opposite the seal such that a pressure surge that occurs from the admission of inlet gas into the valve causes the piezoceramic element and seal to positively seat.

* * * * *